United States Patent Office 2,960,484
Patented Nov. 15, 1960

2,960,484
METHYLOL-AMINO-EPIHALOHYDRIN RESINOUS PRODUCTS AND METHOD FOR MAKING SAME

George Cecil Daul, Mobile, Ala., assignor to Courtaulds, Inc., New York, N.Y., a corporation of Delaware No Drawing. Filed June 4, 1957, Ser. No. 663,345

40 Claims. (Cl. 260—21)

This invention relates to a new stable, water soluble resinous precondensate suitable for treating fibrous materials, to a method of treating fibrous materials to improve their properties, and to fibrous materials so treated.

This application is a continuation-in-part of my copending application Serial No. 563,429 filed February 6, 1956 and now abandoned.

It is conventional practice to apply to fibrous materials, such as regenerated cellulose fiber, various types of finishes to improve their qualities of crease and abrasion resistance, dimensional stability, dyeing affinity, and the like, and to decrease their water imbibition. Water imbibition is a measure of the resistance of a fiber to swelling and deterioration by water. It is defined as the percent by weight of water retained in saturated material after centrifuging a 0.5 gram sample for 5 minutes at 1000 G. and is expressed as percent of the oven dry weight of the fiber. See Journal of the Society of Dyers and Colourists, October 1948, page 331, and Proceedings, Journal of the Textile Institute 40, page P678 (1949). The lower the water imbibition the greater the water resistance of the fiber.

It has been proposed to use various types of synthetic resins for textile finishing. Among the resins which have been suggested are the so-called "aminoplasts," that is heat convertible resinous condensation products prepared from amino or amide compounds and having the property of curing under heat, or under heat or pressure to an infusible insoluble state. Typical aminoplasts are urea-formaldehyde and melamineformaldehyde resins. In general, however, aminoplasts require a catalyst to effect their cure, and in most cases the catalysts are substances which promote degradation or else undesirably change the characteristics of the fiber. In many instances, prior resins have also required the use of a plasticizer to prevent undesirable harshness in the treated product. In certain cases, an unacceptable yellowing effect has been experienced with prior resins.

According to the present invention, these difficulties are overcome by means of a stable, water soluble resinous precondensate which is the reaction product of (1) a resin forming amino component containing at least two amino groups and including the molecular fragment

where X is oxygen or trivalent nitrogen,
(2) an epihalohydrin; and
(3) a substance which will form methylol groups with the amino compounds.

In general, any resin forming amino component having the structure defined above may be employed. The component must be free of groups such as the —C=S group which would interfere with the epihalohydrin reaction. Examples of suitable compounds are urea, guanidine, cyanoguanidine (dicyandiamide), and melamine type compounds i.e. 1,3,5-amino triazines having at least two reactive amino groups, such as melamine itself.

Any suitable epihalohydrin containing an active epoxy group and an active halogen may be used. Examples of suitable compounds are epichlorohydrin, epibromohydrin and epiiodohydrin.

Examples of suitable compounds which will form methylol groups with the amino compounds are formaldehyde and paraformaldehyde. Other compounds having this characteristic may also be used.

Resinous materials suitable for molding have previously been made by reacting epoxy compounds such as, for example, as ethylene oxide, with, for example, methylol melamines. Great difficulty has been experienced, however, in obtaining colorless compounds and usually a decolorizing agent has had to be employed. Moreover, so far as is known, a precondensate of an amino compound, an epihalohydrin, and a methylol former capable of forming a substantially colorless stable aqueous solution suitable for textile applications has not hitherto been produced.

According to the invention, precondensates having these properties are formed by first reacting the amino compound with the epihalohydrin under neutral or slightly alkaline conditions to form an amino-epihalohydrin adduct, such as an epoxy propylamino compound or a 1-chloro-2-hydroxy-propylamino compound. Excess epihalohydrin, if present, is then removed, and the adduct is reacted with the methylol former in the presence of an alkaline catalyst such as alkali hydroxides and alkaline earth hydroxides. Preferably, the molar equivalent of alkali used as a catalyst should be less than the molar equivalent of the epihalohydrin, to leave sufficient halogen in the finished product to help catalyze the curing of the precondensate.

It is particularly important to react the amino compound with the epihalohydrin prior to addition of the methylol former, because epihalohydrins such as epichlorohydrin react with alcohols, in the presence of alkali, to form di-ethers. For example, if formaldehyde is reacted with melamine to form methylol melamine, and epichlorohydrin is present, di-ether formation will occur to produce an insoluble material.

While the mechanism involved in the formataion of the precondensate of the present invention is not fully known, the following reactions between urea, epichlorohydrin and formaldehyde illustrate the probable basis for the precondensate:

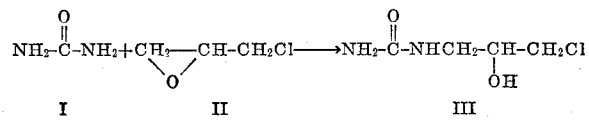

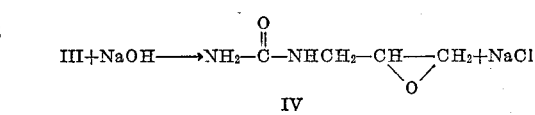

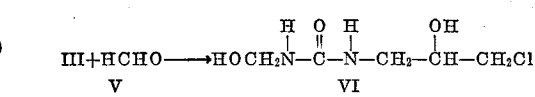

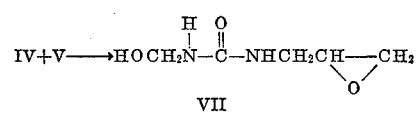

IV may also react with more of I to give,

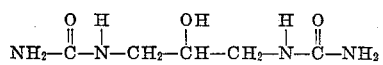

which could then react with formaldehyde.

The precondensate is considered to be a combination of VI and VII.

In any case, it is desirable that a sufficient amount of VI be present to catalyze the curing of the precondensate so formed. Thus, the precondensate carries its own catalyst, and though additional acid catalyst may be added prior to curing, this is not essential.

The auto-catalytic properties of these precondensates may also be augmented by using an alkaline earth hydroxide in place of the sodium hydroxide illustrated above. This is due to the formation of alkaline earth halides, which catalyze the curing of the precondensates. Preferably magnesium hydroxide is used forming magnesium chloride during the condensation reaction. Magnesium chloride is an excellent catalyst for the novel precondensates and may be added as such when additional catalyst is desired. Good results were also obtained with calcium hydroxide and barium hydroxide.

It is also an advantage of the new precondensate that it furnishes its own plasticizer, apparently by way of the glycol groups formed by opening of the epoxy ring.

The exact proportions of the three components which can be used will, of course, vary with the particular compounds being employed.

In general, for every mole of amino compound at least 0.1 mole of epihalohydrin and at least 1.5 moles of methylol former are used. An excess of epihalohydrin or methylol former may be employed, but preferably not more than about 2 moles of epihalohydrin and 5.9 moles of methylol former are used, per mole of amino compound.

Specifically, where urea is the amino compound, epichlorohydrin the epihalohydrin and formaldehyde the methylol former, for every mole of urea, between about 1 and about 0.1 moles of epichlorohydrin and between about 1.5 and about 2.0 moles of formaldehyde are used. Where melamine is substituted for urea, for every mole of melamine, usually between about 2.0 and about 0.1, preferably between about 1.0 and about 0.5 moles of epichlorohydrin and between about 1.5 and about 5.9, preferably between about 1.5 and about 4 moles of formaldehyde are used. When dicyandiamide is substituted for urea, for every mole of dicyandiamide, preferably between about 1 and about 0.1 moles of epichlorohydrin and between about 1.5 and about 2 moles of formaldehyde are used.

Mixtures of two or more amino compounds may also be used as the amino component in the resin precondensates. For example, useful resinous materials have been prepared using 1 mole of urea, 1 mole of melamine, from 2 to 1 moles of epichlorohydrin and from 1.5 to 6.0 moles of formaldehyde. Other combinations of the class of amino compounds defined may also be employed.

To prepare the novel precondensates, the amino compound is first reacted with the epihalohydrin in neutral or slightly alkaline (e.g. pH about 7 to 9) aqueous solution at a temperature between about 80 and about 110° C. to form the amino-epihalohydrin adduct. When this reaction has been accomplished, any unreacted epihalohydrin may be removed under reduced pressure (e.g. less than about 30 mm. Hg absolute). The intermediate product is then cooled to about 80° C. or lower (e.g. between about 10° C. and about 70° C.) and reacted with the methylol former. In the latter reaction, alkali may be added to bring the pH to between about 8 and about 10, and the temperature is raised to between about 40 and about 90° C. The amount of alkali present is preferably not in excess of the molar proportion of epihalohydrin.

It should be noted that in preparing the novel precondensate, the epihalohydrin is first reacted with the amino compound and that adduct is then reacted with the methylol former. Reaction of the epihalohydrin requires a relatively high temperature, i.e. above about 80° C. If methylol former is present, either as such or partially condensed with the amino compound, the temperatures required for the epihalohydrin reaction will tend to condense or further condense the methylol former and amino compound, leading to an unstable, discolored product.

When the methylol former addition is completed (usually after about ½ to about 2 hours) the reaction mixture is allowed to stand at room temperature.

The precondensate thus obtained is very soluble in water. In concentrations of 40–60% solids, it may crystallize on standing at room temperature, but slight warming is sufficient to cause solution even at these high concentrations. Such aqueous solutions are stable and can be stored without danger of condensation for extended periods of time.

Even greater stability can be obtained by adding to the precondensate solution additional alkali. The amount of alkali added for this purpose is preferably controlled so that the total alkali present in the precondensate solution is not more than about 90 percent of the stoichiometric equivalent of the epihalohydrin in the reaction product. The precise alkali compound used is not critical. Examples of suitable compounds are sodium hydroxide, potassium hydroxide, calcium hydroxide, magnesium hydroxide, sodium carbonate, and the ethanol amines. Sodium hydroxide is preferred because it causes reformation of epoxy groups more efficiently.

It has also been found that the stability of the precondensate may be increased by alkylation with a lower aliphatic alcohol to give an alkylated precondensate. In general, any alkanol having from say 1–6 carbon atoms such for example as methanol, ethanol, propanols and butanols, may be used. Methyl alcohol is generally preferred. The reaction involved is a simple etherification of the methylol group and is illustrated as follows:

$$RCH_2OH + R'OH \rightarrow RCH_2O—R' + H_2O$$

where R is the precondensate residue and R' is an alkyl group having from say 1–6 carbon atoms.

The reaction is preferably carried out in conventional manner, using an acid catalyst such as a mineral acid, for example, phosphoric or hydrochloric acid. Sufficient catalyst is used to adjust the pH to between about 2.5 and about 5.

Because of the acid catalyst involved in this reaction, the alkylation must be carried out without excessive heating to prevent condensation and thus the temperature should be between about 10 and about 50° C., preferably between about 30 and about 45° C. Also there should be as little water in the system as practical, preferably not more than about 20% water on the weight of the reaction mixture. As has been stated, the greatest advantage of the alkylation resides in increased shelf life or stability. Other advantages include lower curing temperature requirements and lower chlorine retention or less yellowing by chlorine bleach.

To determine the concentration of resin solids the clear solution of precondensate may be poured into a shallow dish and the water removed by evaporation. When the evaporation has been completed, the resin can be cured by heating at temperatures above about 70° C.

The precondensate may be applied to fibrous materials, such for example as cellulose or modified cellulose materials in any convenient manner, as by passing the materials through an aqueous solution of the precondensate. The materials may then be heated at a drying temperature of say between about 60° C. and about 100° C. After drying, if desired, the temperature may be raised to between about 105° C. and about 180° C., preferably to between about 120° C. and about 150° C. to cure the resin.

The time required to cure the precondensate depends on the temperature used. It may vary from a few seconds to on the order of an hour.

It will thus be seen that the new precondensates may be cured at temperatures generally lower then required for most similar resins. When the precondensate is applied to fibrous materials, drying and curing may be effected without noticeable migration of the resin in the finished product.

The amount of resinous material applied to fibers will vary with the particular fiber being treated and the results desired. In general, between about 5% and about 25%, preferably between about 10% and about 20% resin solids are applied, based on the weight of the dry fiber.

Where the novel precondensates are applied to regenerated cellulose fibers, as for example to viscose rayon fibers, it is preferred to treat the fibers after the conventional treatments following spinning and before the fibers have been dried. In this way, better penetration of the fibers is obtained.

This new family of resin-forming compounds has a unique advantage over known amino-formaldehyde type resins in that it may be applied effectively to fibrous materials, e.g. fibrous cellulosic materials, in neutral or in alkaline solutions from pH 7.0 to 9, whereas the known amino-resin-formers must be applied in neutral or slightly acid solutions.

This advantage is apparently gained through the available chlorine in the epichlorohydrin reaction products which during drying neutralizes any excess alkali present but surprisingly, does not damage the treated materials in any way on curing.

The novel compounds have another advantage over known amino-formaldehyde-type resins in that they may be applied to textiles in the presence of buffering media such as conventional sodium oleate, oleic acid (pH 7 to 7.5) solutions used for the finishing of staple rayon and the like, and containing for example about 0.15% sodium oleate and 0.15% oleic acid. In this case, small amounts, for example from 1 to 5% on the weight of the precondensate of an acid-forming catalyst, such as metallic chlorides, ammonium chloride, ammonium phosphate or organic acid salts may be desirable to obtain more effective curing.

Again, the precondensate may be applied to fibrous material in solution with cationic, anionic, or non-ionic softening agents customarily used in the textile industry, such for example as octadecyl pyridinium sulfate, aryl sulfonates or lauryl amine polyoxyethylene condensates.

The precondensate may also be used with conventional water repellent agents which may also have softening properties, such for example as stearamidomethyl pyridinium chloride, or the silicone-type repellents, such as those disclosed in United States Patents 2,415,017 and 2,429,883. Patent No. 2,415,017 to MacKenzie discloses compositions made by reacting at about 90° C., a tertiary amine with the reaction product of formaldehyde, a silicon halide and a fatty acid amide containing from 12 to 30 carbon atoms.

Patent No. 2,429,883 discloses organosilicon amines having the general formula

$$R_nSi(NR'_2)_{4-n}$$

where R and R' are alkyl radicals and n is an integer less than 4.

As will be shown in the examples below, when the new compounds are incorporated in a sodium oleate finish and applied to viscose staple fiber, it is possible to obtain water imbibition values as low as 30-40% with as little as 10% applied resin. There is no yellowing and the products have a soft handle and are suitable for further processing without after-washing.

When applied to cellulosic textile materials such as cotton, rayon and the like, valuable properties are imparted to the textile which are not inherent in the textile. In the case of viscose rayon, wet strength is increased and water imbibition is decreased. Improvements in such properties as crease-resistance, abrasion resistance, dimensional stability, dye acceptance and the like, are also achieved.

If desired, the resinous precondensate may be applied to fibrous materials as a solution in an organic solvent rather than as an aqueous solution. In preparing such organic solutions, the aqueous reaction mixture is treated to remove excess water, as by spray drying, and the resulting solid is dissolved in an organic solvent such as methanol to give a completely stable solution.

The invention will be further described by means of the following specific examples, it being understood these examples are given for purposes of illustration only and are not to be taken as in any way limiting the invention beyond the scope of the appended claims.

In the examples, unless otherwise specified, percentages and properties are by weight.

SERIES A—EXAMPLES USING UREA AS THE AMINO COMPOUND

*Example I*

60 g. (1 M) of urea was dissolved in 65.3 ml. of water and 30.9 ml. (0.4 M) of epichlorohydrin added dropwise. The mixture was heated to reflux with a stirring and sodium hydroxide was added as needed to maintain a pH of 7. When the temperature of the refluxing mixture reached 110° (in about 1 hour), the heat source was removed, vacuum applied and 40 ml. of water distilled off. The product was cooled to 20° and 120 g. (1.6 M) of 40% formaldehyde (neutralized with dil. NaOH) added. A total of 17 ml. of 12.5% NaOH solution was added as required to maintain neutrality. The mixture was stirred for an hour, filtered and bottled.

10 g. of the liquid product was placed on a crystallizing dish and heated in a blower oven at 110° C. for two hours. On cooling it weighed 5.4 g. indicating that the resin solution contained approximately 54% solids. The product was a clear plastic sheet, insoluble in water and organic solvents. It contained 24% nitrogen. The precondensate was applied to continuous filament viscose rayon yarn incorporated in a sodium oleate finish (pH 8) containing also 0.5% by weight sodium oleate and 0.15% by weight oleic acid. The treated fiber was squeezed and dried in an oven at 110° C. for one hour. Water imbibition of a control sample was 89%. Resin treated samples had water imbibitions of 50%, 45%, and 40%.

*Example II*

60 g. (1 M) urea and 60 ml. water were placed in a flask and dissolved. 38.5 ml. (0.5 M) of epichlorohydrin added gradually and heated to reflux. Refluxing began at 85° C. and the temperature gradually rose as the epichlorohydrin reacted. A total of 35 ml. of 12.5% sodium hydroxide solution was added periodically to maintain alkalinity. When the temperature of the boiling mixture reached 110° C., heat was removed and 90 ml. of water removed under vacuum. The product was cooled to 20° C. and 112.5 g. (1.5 M) of 40% formaldehyde added gradually with stirring. An additional 14 ml. of sodium hydroxide solution was required to maintain neutrality during this addition. The reaction between the formaldehyde and the urea-epichlorohydrin reaction product is slightly exothermic and the mixture warmed spontaneously to 35° C. It was stirred for one hour, filtered and bottled. 10 g. placed on a crystallizing dish and dried at 110° C. gave a clear plastic film which weighed 4.9 g. and contained 22.98% nitrogen. The resin precondensate solution was mixed with aqueous sodium oleate-oleic acid solution (used in finishing rayon) to give mixtures containing 10%, 15%, and 20% resin contents. Unfinished viscose rayon yarn was soaked in these solutions and one sample was soaked in plain soap solution for control purposes. The skeins of yarn were centrifuged, then hung in a blower oven at 110° C. for one hour. Results are shown below.

| Sample number | Resin applied, Percent | Water imbibition, Percent | Tenacity | | Elongation | | Denier | Increase in Denier, Percent [1] |
|---|---|---|---|---|---|---|---|---|
| | | | Dry, g./d. | Wet, g./d. | Dry, Percent | Wet, Percent | | |
| 1 | none (control) | 87.1 | 2.14 | 1.31 | 25.4 | 35.2 | 230 | |
| 2 | 10 | 44.9 | 2.04 | 1.51 | 16.8 | 25.4 | 247 | 7 |
| 3 | 15 | 39.4 | 2.05 | 1.50 | 18.2 | 16.8 | 257 | 12 |
| 4 | 20 | 31.5 | 1.99 | 1.46 | 15.2 | 15.8 | 253 | 10 |

[1] Increase in denier is a rather good approximation of the amount of resin taken up by the rayon. These results indicate that excessive amounts of the resin will not be absorbed by rayon.

*Example III*

The same resin precondensate-soap solution used for Sample 4 in Example II above was retained for 24 hours and applied to a skein of viscous rayon yarn as above. This skein had a water imbibition of 47%, tenacity of 2.13 g./d. dry, 1.48 g./d. wet; elongation of 13.2% dry, 16.4% wet; denier of 253 indicating 10% resin taken up. Thus the precondensate solution had not significantly deteriorated after standing for a day.

*Example IV*

Viscose staple rayon fiber was obtained from a manufacturing plant wash-machine, just prior to the final finish, in the wet state. One sample was soaked in 0.3% sodium oleate-oleic acid finish solution, squeezed through the rolls of a wringer and then spread on the shelf of an oven set at 110° C. and dried for one hour. Three other samples were treated with a like soap solution containing 10%, 15%, and 20% of resin respectively, prepared as in Example II above. Water imbibitions of the four samples were 117.1%, 48.4%, 42.4%, and 39% respectively. After repeated extraction with hot water, nitrogen contents of the four samples, in the order given above, were 0.4%, 1.5%, 1.9%, and 2.1%, indicating good resin retention.

*Example V*

A urea-epichlorohydrin intermediate product, prepared from 1 mole of urea, 0.5 moles of epichlorohydrin and 0.3 mole of 20% sodium hydroxide was reacted with 2 moles of formaldehyde in a manner similar to those above. Viscose rayon staple fiber was treated with a sodium oleate-oleic acid finish containing this resin precondensate, in concentration of 8.3%, 12.5%, 16.6%, and 20.7%, and dried at 110° C. for one hour. Products with water inbibitions of 39.5%, 41.4%, 38.4% and 31.8% respectively were obtained. The control sample, treated with sodium oleate-oleic acid finish only and dried in the same manner had a water imbibition of 108%.

*Example VI*

One hundred and twenty grams (2 M) urea in 60 ml. water was reacted at reflux with 156 ml. (2 M) epichlorohydrin. Temperature of this reaction was 88–110° C. When the epichlorohydrin addition was completed, the mixture was stirred for an additional 15 minutes and cooled to 50° C. 387 grams of a methanol solution of formaldehyde (3 M) and 30 ml. of 30% sodium hydroxide was added. The mixture was heated to 60° C. and stirred for 1 hour. It was cooled to room temperature and sufficient orthophosphoric acid added to bring the pH to 4.5. 100 ml. of methanol was added and the mixture heated to 45° C. for 20 minutes, cooled to room temperature, pH adjusted to 8 with sodium hydroxide. After filtering to remove sodium phosphate, the product was a water-white liquid. Analyses showed the dried resin product to have 18.6% nitrogen, 4.6% chlorine and 17.9% methoxyl. When the resin solution was applied to rayon fiber in 4, 6, 8 and 10% concentration using magnesium chloride catalyst, water imbibition values of from 45 to 30%, respectively, were obtained. Shelf-life of the concentrated precondensate was considerably longer than normal.

*Example VII*

Sixty grams urea (1 M) in 60 ml. water was heated to 70° C. at which point 78 ml. (1 M) epichlorohydrin was added dropwise with stirring over a period of 1 hour. The temperature at the end of this reaction was 100° C. The heat source was removed and the product allowed to cool to 50° C. 10 g. Mg(OH)$_2$ in 162 g. (2 M) of 37% formaldehyde solution was added and the temperature maintained at 45–50° C. for 1 hour. The filtered product was a clear liquid containing 40.7% solids. Regenerated cellulose fiber impregnated with a 10% solution of this resin showed a water imbibition of about 40%.

This procedure was repeated using various amounts of calcium and barium hydroxide. Regenerated cellulose fibers treated with these resins had water imbibition values equivalent to the products obtained using sodium hydroxide.

SERIES B—EXAMPLES SHOWING THE EFFECT OF VARYING THE PROPORTION OF EPIHALOHYDRIN

*Example VIII*

60 g. urea (1 M) and 50 ml. water were placed in a round bottomed flask fitted with a thermometer, condenser and stirrer, and heated at 80° C. 80 ml. of epichlorohydrin (1 M) was added dropwise to the urea solution at refluxing temperature over a period of one hour. After the final addition of epichlorohydrin, the temperature rose to 105° C. at which point the heat source was removed. Vacuum was then applied to the flask through the condenser to reduce the temperature and to remove any unreacted epichlorohydrin (only a trace was recovered). When the temperature reached 30° C., 10 ml. of cold 20% sodium hydroxide was added and mixed with the product.

5 ml. of 20% sodium hydroxide solution was added to 162 g. of 37% formaldehyde (2 M), mixed and added to the flask with stirring. The flask was heated gradually to 60° C., the heat source removed and the product stirred for one hour. The product was allowed to stand overnight before use. It was a clear liquid which could be cast into clear flexible films.

The precondensate was applied to never-dried viscose rayon staple in 10 to 14% concentration in sodium oleate-oleic acid finish at pH 7.5, pressed free of excess, then dried at 80° C., and cured at 150° C. for ten minutes. Water imbibition values of 40 to 35% were obtained which were little affected by alkali scouring. Treated samples boiled in sodium hypochlorite solution showed no yellow discoloration due to chlorine retention. A film cast from this precondensate and cured at 110° C. had 19% N, 9% Cl.

*Example IX*

A resin precondensate was prepared from 1 mole urea, 0.3 mole of epichlorohydrin, 1.7 moles formaldehyde and 0.15 mole of sodium hydroxide in the manner described in the examples above. The resin solution had a solids content of 55.3%. When applied to viscose staple fiber as described above in 15% concentration, the dried sample had a water imbibition of 52.5%. A control had a water imbibition of 118.5%.

Example X

A resin precondensate was prepared from 1 mole urea, 0.2 mole of epichlorohydrin, 1.8 mole of formaldehyde and 0.1 mole of sodium hydroxide as described above. When applied to viscose staple fiber in 15% concentration, the dried sample had a water imbibition of 55.2%. The control had a water imbibition of 118%.

Example XI

A resin precondensate was prepared from 1 mole urea, 0.1 mole epichlorohydrin, 1.9 mole formaldehyde and 0.05 mole of sodium hydroxide as described above. When applied to viscose staple fiber in 15% concentration, the dried sample had a water imbibition of 55.5%. A control sample had a water imbibition of 118%.

SERIES C—EXAMPLES USING MELAMINE AS THE AMINO COMPOUND

Example XII

A melamine-epichlorohydrin-formaldehyde precondensate with a molar ratio of 1:0.5:3 was prepared by reacting melamine (63 g.) with epichlorohydrin (20 ml.) in 60 ml. of water at reflux for two hours. 13 ml. of water were removed by vacuum distillation and the product cooled to 20° C. 4 ml. of 20% sodium hydroxide and 118.5 g. of 38% formaldehyde were added with stirring and heat was applied until a clear solution resulted (at about 75° C). Stirring was continued for 30 minutes and the product was filtered.

When a sample of the liquid product was dried on a glass plate, a clear film resulted which, when analyzed, was found to contain 34.6% nitrogen.

Viscose rayon staple fiber, wet with 12% solution of this precondensate, containing 0.2% of a cationic softening agent at pH 7.5, when centrifuged and dried at 80° C., and cured at 110° C. for one hour, had a water imbibition of 39%.

Example XIII

The procedure of Example XII was used to prepare a resin precondensate from 1 M melamine, 0.5 M epichlorohydrin and 4 M. formaldehyde. Rayon, treated with this precondensate, as before, had a water imbibition of 36%.

Example XIV

The procedure of Example XII was used to prepare a resin precondensate from 1 M melamine, 0.75 M epichlorohydrin and 3 M formaldehyde. Rayon samples, treated with this material, had water imbibitions of 35 to 40%.

Example XV

The procedure of Example XII was used to prepare a resin precondensate from 1 M melamine, 1 M epichlorohydrin and 3 M formaldehyde. Rayon samples, treated with this precondensate, had water imbibitions of 32 to 38%.

Example XVI

The procedure of Example XII was used to prepare a resin precondensate from 1 M melamine, 2 M epichlorohydrin, and 4 M formaldehyde. Rayon samples, treated with this precondensate, had water imbibitions of 30 to 38%.

Example XVII

One hundred and twenty-six grams (1 M) melamine in 100 ml. of water was reacted with 158 mls. (2 M) epichlorohydrin added dropwise at reflux (88–96° C.) over a period of one hour with stirring. The product was stirred for an additional one-half hour, and then cooled to 60° C. when 194 grams (3 M) of 46% formaldehyde in methanol and 20 ml. of 30% sodium hydroxide were added. The mixture was heated to 90° C. for 5 minutes and at 70° C. for one-half hour, then cooled to room temperature. It was acidified to pH 4.5 with phosphoric acid, heated to 45° C. for 20 minutes, cooled to room temperature and pH adjusted to 8 with sodium hydroxide. After filtering off the sodium phosphate formed, the product was a clear water-white liquid. The dried resin contained 22.4% nitrogen, 13.8% chlorine and 9.9% methoxyl. Applied to rayon fiber, dried and cured, good results were obtained in the reduction of water imbibition. The shelf-life of the alkylated material was appreciably longer compared with non-alkylated precondensate.

Example XVIII

The procedure of Example XII was repeated in detail except that 4 moles of formaldehyde in methanol was used in the condensation step and an extra 100 ml. of methanol was added prior to the addition of phosphoric acid. The resin product in this case contained 25.7% nitrogen, 8.9% chlorine and 16% methoxyl.

Example XIX 126 grams (1 M) melamine in 100 ml. water was reacted with 78 ml. (1 M) epichlorohydrin at reflux over a period of 1 hour. 244 grams 37% formaldehyde and 25 ml. of 30% NaOH were added at 85° C. and the product allowed to stir without heating for 1 hour. 100 ml. of water was removed by vacuum distillation at ambient temperature. 400 ml. of ethanol was added, pH adjusted to 4 with phosphoric acid and the mixture warmed to 50° C. for 20 minutes, cooled, then neutralized with NaOH solution. The filtered product was a clear, water-white liquid. The resin solid contained 33% N, 5.4% Cl and 12% ethoxyl. A similar product was obtained using n-propanol as the alkylating agent.

Example XX

One hundred and twenty-six g. (1 M) melamine and 120 ml. water was heated to 70° C. 78 ml. (1 M) epichlorohydrin was added dropwise with stirring over a period of 1 hour. The temperature at the end of the reaction was 97° C. The heat source was removed and the temperature allowed to drop to 65° C. at which point 162 g. (2M) of 37% formaldehyde solution and 30 g. of barium hydroxide were added. The temperature was maintained at 65° C. for 1 hour. The initial product was slightly cloudy but was clear after filtration. Regenerated cellulose fiber treated with a 12% solution of this resin had a water imbibition of about 40%.

The same general procedure was used to prepare precondensates using various amounts of magnesium, and calcium barium hydroxides. Similarly good water imbibition values were found.

SERIES D—EXAMPLES USING DICYANDIAMIDE AS THE AMINO COMPOUND

Example XXI

Dicyandiamide (84.1 g.), water (100 ml.) and epichlorohydrin (40 ml.) were refluxed together for 45 minutes to a temperature of 104° C. 23 ml. of water were collected by vacuum distillation and the product was cooled to 28° C., at which point it crystallized. 14 ml. of 20% sodium hydroxide and 237 g. of 38% formaldehyde solution was added with stirring, then warmed to 50° C. for 30 minutes. (The weights used correspond to 1 M dicyandiamide, 0.5 M epichlorohydrin, and 3 M formaldehyde.) Rayon fiber, treated with 12% solutions of the precondensate at pH values of 7 to 8.5 had water imbibitions of 45 to 50%.

Example XXII

The procedure of Example XXI was used to prepare a resin precondensate from 1 M dicyandiamide, 1 M epichlorohydrin, and 1.5 M formaldehyde. When applied to rayon, water imbibition values of 45 to 50% were obtained.

SERIES E—EXAMPLE USING GUANIDINE AS THE AMINO COMPOUND

*Example XXIII*

Guanidine was reacted with epichlorohydrin and formaldehyde in ratios of 1:0.5:2, 1:0.5:3, and 1:1:2, respectively, by procedures described in previous samples. The liquid products thickened to a syrup on dehydration and solidified on cooling. When never-dried viscose rayon was treated with the resin in concentrations of 10, 12, and 14% with a catalyst, the rayon accepted acid dyes even after hot washing, indicating a reaction between the rayon and the resin.

SERIES F—EXAMPLES USING TWO AMINO COMPOUNDS

*Example XXIV*

A melamine-urea-epichlorohydrin-formaldehyde precondensate was prepared by reacting 60 g. (1 M) urea with 40 ml. (0.5 M) epichlorohydrin in the presence of 50 ml. of water at reflux. When the temperature reached 108° C., heating was discontinued and 126 g. melamine (1 M) were added with stirring and heating resumed. 80 ml. (1 M) epichlorohydrin were added dropwise while maintaining reflux conditions. Heating was continued for fifteen minutes after the final addition of epichlorohydrin.

Vacuum was then applied and 22 ml. of water and 3 ml. unreacted epichlorohydrin were removed. The product was allowed to cool to room temperature 25° C. and 20 ml. of 25% sodium hydroxide solution added and mixed well. To 165 g. of 38% formaldehyde were added 10 ml. of 20% sodium hydroxide solution, mixed and added to the product above. 62.7 g. of paraformaldehyde were then added and the mixture heated with stirring to 74° C. The clear precondensate solution was then filtered and allowed to stand for twenty-four hours.

It contained 75% solids. When viscose rayon fiber was treated with a 14% solution of the precondensate, pressed free of excess and heated for one hour at 115° C., the water imbition of the rayon was 35%.

*Example XXV*

Urea (30 g.), melamine (63 g.), water (75 ml.) and epichlorohydrin (40 ml.) were refluxed for two hours to a temperature of 104° C. 23 ml. of water were collected by vacuum distillation and the product cooled to 20° C. 7 ml. of 20% sodium hydroxide and 197 g. of 38% formaldehyde solution were added to the above product with stirring, the mixture warmed to 64° C. and maintained at this temperature for thirty minutes. A clear solution containing 51.6% solids resulted. Rayon fiber, treated with 10 to 14% of this precondensate had water imbitions of 35 to 39%. The mole ratio of reactants to this precondensate was: 1 melamine:1 urea:1 epichlorohydrin:5 formaldehyde.

*Example XXVI*

The same procedure as in Example XXV was used to prepare a resin precondensate from 1 M melamine, 1 M urea, 1 M epichlorohydrin, and 4 M formaldehyde. When applied to rayon as above, like results were obtained.

*Example XXVII*

The same procedure as in Example XXV was used to prepare a resin precondensate from 1 M melamine, 1 M urea, 1 M epichlorohydrin and 3 M formaldehyde. Like results were obtained.

*Example XXVIII*

The same procedure as in Example XXV was used to prepare a resin precondensate from 1 M melamine, 1 M urea, 1.5 M epichlorohydrin and 4 M formaldehyde. Like results were obtained.

*Example XXIX*

The same procedure as in Example XXV was used to prepare a resin precondensate from 1 M melamine, 1 M urea, 1.5 M epichlorodin and 3 M formaldehyde. Like results were obtained.

*Example XXX*

Urea (60 g.), water (60 ml.) and epichlorohydrin (40 ml.) were refluxed for one hour at 110° C., cooled slightly to stop refluxing, then melamine (126 g.) and more epichlorohydrin (80 ml.) were added to the reaction flask and refluxed to 104° C. for an additional hour. 25 ml. of water was collected by vacuum distillation and the product cooled to 20° C. 25 ml. of 20% sodium hydroxide solution and 320 g. of 38% formaldehyde were added and mixed while heating to 68° C. The molar ratios of reactants in this sample were the same as in Example XXIX.

Applied to viscose rayon fiber in 10 to 14% concentration at pH 8 and cured, the precondensate gave samples with water imbibition values of 35 to 40%.

*Example XXXI*

60 grams urea (1 M), 126 grams melamine (1 M), and 100 ml. water was reacted with 156 ml. (2 M) of epichlorohydrin at reflux. Temperature ranged from 80–103° C. during this reaction. The mixture was stirred for one-half hour after which 323 grams of formaldehyde in methanol solution (46% formaldehyde) and 30 ml. of 30% sodium hydroxide added and the mixture heated to 85° C. for 5 minutes, cooled to 70° C. and stirred at this temperature for one-half hour. It was cooled to room temperature after which 200 ml. of methanol was added. The product was acidified to pH 4.5 with phosphoric acid and heated to 45° C. for 20 minutes, then cooled to room temperature and neutralized with sodium hydroxide to pH 8.

The solid resin, cast from this product contained 25.8% N, 7.4% Cl and 16.3% $OCH_3$. Water imbibition values as low as 38% were obtained using 10% of this precondensate on rayon fiber.

*Example XXXII*

60 g. (1 M) urea, 60 g. (0.48 M) melamine and 100 ml. water were mixed and heated to 70° C. 118 ml. (1.48 M) epichlorohydrin was added dropwise with stirring over a period of 1 hour. The temperature was raised to 100° C. and maintained for fifteen minutes after the final epichlorohydrin addition. The reaction mixture was allowed to cool to 60° C. at which temperature 243 g. (3 M) of 37% formaldehyde and 10 gm. calcium hydroxide were added. The reaction was allowed to continue for 1 hour at 60° C. The product was a clear liquid. Regenerated cellulose fiber impregnated with a 10% solution of this product had a water imbibition of about 42%.

The same procedure was repeated using magnesium and barium hydroxide. Satisfactory results were obtained.

SERIES G—EXAMPLES SHOWING MODES OF APPLYING THE PRECONDENSATE

*Example XXXIII*

In order to show the wide range of pH values at which these resin precondensates may be applied and still get effective curing, the following experiment was run: 14% of urea-epichlorohydrin-formaldehyde precondensate with molar ratios of 1:0.5:2, was applied in aqueous solution containing 0.2% of a cationic softening agent. pH of the solutions were adjusted to 7.0, 7.5, 8.0 and 8.5 with sodium hydroxide in one case and with monoethanolamine in another. These solutions were applied to rayon staple fiber as in previous examples. Water imbibition values were 31.5%, 38.7%, 40.6%, 39.5%, and 38.5%, 37.4%, 37.0% and 43.9% respectively.

*Example XXXIV*

This example, in addition to showing the application of the novel precondensate with softening agents, illustrates how the resin can be stabilized by the addition of alkali.

60 g. (1 M) urea, 126 g. (1 M) melamine and 50 ml. of water were placed in a round bottom flask fitted with a stirrer, condenser and thermometer. The flask was warmed to 80° C., thermometer removed and a dropping funnel containing 80 ml. (1 M plus slight excess) epichlorohydrin inserted. The epichlorohydrin was admitted to the flask dropwise over a period of one hour. Mild refluxing was continued for 15 minutes after the final addition of epichlorohydrin.

The heat source was removed and vacuum applied. Approximately 16 ml. water and excess epichlorohydrin were withdrawn. When the temperature of the product reached 35° C., 20 ml. of cold (5° C.) 20% sodium hydroxide solution were added with stirring. 10 ml. of cold 20% sodium hydroxide solution were added to 406 g. (5 M) of 37% formaldehyde, mixed and added to the flask with stirring. The flask was warmed gradually to 65° C. at which temperature a clear solution resulted. Stirring was continued without heat until room temperature, 25° C., was reached. 12.5 g. of solid sodium hydroxide pellets were added with stirring and the solution allowed to stand 16–24 hours before use.

This resin precondensate had a shelf-life of several months. When a latent acid-forming catalyst such as Monsanto's Catalyst AC (an organic salt) was added to the resin precondensate, no condensation was observed even after two weeks of standing.

6%, 8%, and 10% concentrations of this resin precondensate in a 0.2% solution of a cationic softener (Aerotex Softener H, a mixture of cationic and anionic long chain derivatives) with 5 parts (per hundred parts of resin) of Monsanto Catalyst AC were applied to never-dried rayon staple fiber, squeezed free of excess and dried at 80° C. for 40 minutes, cured at 150° C. for 15 minutes. Water imbibition values of 45%, 39%, and 39%, respectively, were obtained.

*Example XXXV*

Because of the unusually long shelf life of the resin precondensate of Example XXXIV, a large batch was prepared by the same procedure and applied to rayon staple fiber in 10% concentration on a Pilot Plant washing machine as the final finish and the fiber dried for 40 minutes at 80° C.

The fiber was carded, spun into yarn and woven into cloth. A portion of the cloth was heated in an oven at 110° C. for one hour. The water imbibition was 42%. After ten cotton washes in a washing machine, the water imbibition was 47%. The cloth was dimensionally stable within 4%. A duplicate piece of cloth pressed with a hot iron had a water imbibition of 50%.

*Example XXXVI*

Never-dried viscose rayon staple fiber was soaked in a bath containing 10% of a resin precondensate prepared as in Example XXXIV, 5 parts per hundred of resin of an amino-acid catalyst, 2 parts per hundred of a silicone type water repellent (Hydropruf, Arkansas Chemical Company) and its catalyst (Cobelfix, Arkansas Chemical Company), centrifuged to about 100% pickup on the weight of the fiber, dried at 80° C. for 40 minutes and cured at 150° C. for 7½ minutes.

The water imbibition of the treated rayon was 35% and the fiber was extremely water repellent. The water repellency persisted after soap and soda scouring at 90° C. and extraction with hot benzene for 24 hours. Other commercial silicone type water repellent agents were used, such as Repelotex (Onyx Chemical Company), Dow Corning 105 Emulsion and Decetex 104 (Dow Corning Company), with similar results. Control samples of rayon treated with the water repellent agents alone were not as durable to scouring as the resin-treated samples.

*Example XXXVII*

A sample of never dried rayon staple was treated with a bath containing 10% of a resin precondensate as in Example XXXIV. 5 parts per hundred of resin of an amino-acid catalyst, 3% of a stearamidomethyl pyridinium chloride water repellent agent and 0.3% sodium acetate, were centrifuged, dried and cured as in Example XXXVI above. The product had a water imbibition of 38% and was more durably water repellent than control samples treated with the repellent agent alone.

What I claim is:

1. A stable, water-soluble resinous precondensate made by reacting between about 0.1 and about 2 moles of an epihalohydrin with 1 mole of an amino component selected from the group consisting of urea, guanidine, dicyandiamide, 1,3,5-aminotriazines having at least two reactive amino groups, and mixtures thereof, to form an amino epihalohydrin adduct; and then reacting said adduct with between about 5.9 and about 1.5 moles of a methylol forming compound selected from the group consisting of formaldehyde and paraformaldehyde.

2. The precondensate claimed in claim 1 in which the epihalohydrin is epichlorohydrin.

3. The resinous precondensate claimed in claim 1 in which the amino component is urea, the epihalohydrin is epichlorohydrin and the methylol-forming compound is formaldehyde.

4. The precondensate claimed in claim 3 in which the molar proportion of urea, to epichlorohydrin, to formaldehyde, is 1, to between about 1 and about 0.1, to between about 1.5 and about 2.

5. The precondensate claimed in claim 1 in which the amino component is melamine, the epihalohydrin is epichlorohydrin, and the methylol-forming compound is formaldehyde.

6. The precondensate claimed in claim 5 in which the molar proportion of melamine, to epichlorohydrin, to formaldehyde is 1, to between about 2 and about 0.1, to between about 1.5 and about 5.9.

7. The precondensate claimed in claim 1 in which the amino component consists essentially of melamine and urea.

8. The precondensate claimed in claim 1 in which the amino component is dicyandiamide, the epihalohydrin is epichlorohydrin and the methylol-forming compound is formaldehyde.

9. The precondensate claimed in claim 8 in which the molar proportion of dicyandiamide, to epichlorohydrin, to formaldehyde is 1, to between about 0.1 and about 1, to between about 1.5 and about 2.

10. The precondensate claimed in claim 8 in which the reaction product of the amino-epihalohydrin adduct and the methylol-forming compound is further reacted with between about 1 and about 6 moles of an alkanol having not more than about six carbon atoms.

11. The precondensate claimed in claim 10 wherein the alkanol is methanol.

12. A method for preparing a resinous precondensate which comprises reacting one mole of a resin-forming amino component selected from the group consisting of urea, guanidine, dicyandiamide, 1,3,5-aminotriazines having at least two reactive amino groups, and mixtures thereof, with between about 2 and about 0.1 moles of an epihalohydrin to form an amino-epihalohydrin adduct, and reacting said adduct with between about 1.5 and about 5.9 moles of a compound capable of forming methylol groups, selected from the group consisting of formaldehyde and paraformaldehyde.

13. The method claimed in claim 12 wherein the amino component and the epihalohydrin are reacted at a pH of between about 7 and about 9, and the product thereof is reacted with the compound capable of forming methylol groups at a pH of between about 6 and about 10.

14. The method claimed in claim 12 wherein the reaction between the adduct and methylol former is conducted in the presence of a base selected from the group consisting of the alkali and alkaline earth hydroxides.

15. The method claimed in claim 14 wherein the reaction is conducted in the presence of sodium hydroxide.

16. The method claimed in claim 14 wherein the reaction is conducted in the presence of magnesium hydroxide.

17. The method claimed in claim 12 wherein the amino component is urea.

18. The method claimed in claim 17 wherein the molar proportions of urea, to epihalohydrin, to methylol-former are 1, to between about 1 and about 0.1, to between about 1.5 and about 2.

19. The method claimed in claim 12 wherein the amino component is melamine.

20. The method claimed in claim 19 wherein the molar proportions of melamine, to epihalohydrin, to methlyol-former are 1, to between about 1 and about 0.5, to between about 1.5 and about 4.

21. The method claimed in claim 12 wherein the amino component is a mixture of urea and melamine.

22. A method for preparing an aqueous precondensate of improved shelf-life which comprises reacting one mole of a resin-forming amino component selected from the group consisting of urea, guanidine, dicyandiamide, 1,3,5-aminotriazines having at least two reactive amino groups, and mixtures thereof, with between about 0.1 and about 2 moles of an epihalohydrin to form an amino-epihalohydrin adduct, reacting said adduct with between about 5.9 and about 1.5 moles of a compound capable of forming methylol groups selected from the group consisting of formaldehyde and paraformaldehyde to form a precondensate and reacting said precondensate with between about 1 and about 6 moles of an alkanol having not more than about six carbon atoms to form an alkylated precondensate.

23. A method for improving the properties of fibrous cellulosic material which comprises applying to said material a stable water-soluble resinous precondensate made by reacting between about 0.1 and about 2 moles of an epihalohydrin with 1 mole of an amino component selected from the group consisting of urea, guanidine, dicyandiamide, 1,3,5-aminotriazines having at least two reactive amino groups, and mixtures thereof, to form an amino epihalohydrin adduct; about 1.5 moles of a methylol forming compound selected from the group consisting of formaldehyde and paraformaldehyde.

24. The method claimed in claim 23 and comprising applying the precondensate as an aqueous solution.

25. The method claimed in claim 23 and comprising heating the fibrous material to which the condensate has been applied at a temperature between about 105° C. and about 180° C., to cure said precondensate.

26. A method for improving the properties of fibrous cellulosic material which comprises applying to said material a stable, water-soluble resinous precondensate made by reacting between about 0.1 and about 2 moles of an epihalohydrin with 1 mole of an amino component selected from the group consisting of urea, guanidine, dicyandiamide, 1,3,5-aminotriazines having at least two reactive amino groups, and mixtures thereof, to form an amino epihalohydrin adduct; then reacting said adduct with between about 5.9 and about 1.5 moles of a methylol-forming compound selected from the group consisting of formaldehyde and paraformaldehyde to form a precondensate and reacting said precondensate with between about 1 and about 6 moles of an alkanol having not more than about six carbon atoms.

27. Fibrous cellulosic material containing a substance obtained by reacting between about 0.1 and about 2 moles of an epihalohydrin with one mole of an amino component selected from the group consisting of urea, guanidine, dicyandiamide, 1,3,5-aminotriazines having at least two reactive amino groups, and mixtures thereof, to form an amino epihalohydrin adduct; then reacting said adduct with between about 5.9 and about 1.5 moles of a methylol-forming compound selected from the group consisting of formaldehyde and paraformaldehyde to form a precondensate and curing said precondensate by heating at a temperature between about 105° C. and about 180° C.

28. Fibrous cellulosic materials as claimed in claim 27 in which the amino component is urea.

29. Fibrous cellulosic materials as claimed in claim 27 in which the amino component is melamine.

30. Fibrous cellulosic materials as claimed in claim 27 in which the amino component is dicyandiamide.

31. Fibrous cellulosic materials as claimed in claim 27 in which the amino component consists essentially of urea and melamine.

32. Fibrous cellulosic materials impregnated with a substance obtained by reacting between about 0.1 and about 2 moles of an epihalohydrin with 1 mole of an amino component selected from the group consisting of urea, guanidine, dicyandiamide, 1,3,5-aminotriazines having at least two reactive amino groups, and mixtures thereof, to form an amino-epihalohydrin adduct; then reacting said adduct with between about 5.9 and about 1.5 moles of a methylol-forming compound selected from the group consisting of formaldehyde and paraformaldehyde, to form a precondensate and reacting said precondensate with between about 1 and about 6 moles of an alkanol having not more than about 6 carbon atoms, to form an alkylated precondensate and curing said alkylated precondensate by heating at between about 105° C. and about 180° C.

33. Fibrous cellulosic materials containing a substance obtained by reacting one mole of a resin-forming amino component selected from the group consisting of urea, guanidine, dicyandiamide, 1,3,5-aminotriazines having at least two reactive amino groups, and mixtures thereof, with between about 0.1 and about 2 moles of an epihalohydrin to form an amino-epihalohydrin adduct, and reacting said adduct with between about 5.9 and about 1.5 moles of a compound capable of forming methylol groups selected from the group consisting of formaldehyde and paraformaldehyde; in combination with a water repellent agent.

34. A finishing agent for fibrous cellulosic materials comprising an aqueous solution of a substance obtained by reacting one mole of a resin-forming amino component selected from the group consisting of urea, guanidine, dicyandiamide, 1,3,5-aminotriazines having at least two reactive amino groups, and mixtures thereof, with between about 0.1 and about 2 moles of an epihalohydrin to form an amino-epihalohydrin adduct and reacting said adduct with between about 5.9 and about 1.5 moles of a compound capable of forming methylol groups selected from the group consisting of formaldehyde and paraformaldehyde.

35. The finishing agent claimed in claim 34 and including a water repellent material selected from the group consisting of stearamidomethyl pyridinium chloride, compositions made by reacting at about 90° C., a tertiary amine with the reaction product of formaldehyde, a silicon halide and a fatty acid amide having from 12 to 30 carbon atoms, and organosilicon amines having the general formula $$R_nSi(NR'_2)_{4-n}$$

where R and R' are alkyl radicals and $n$ is an integer less than 4.

36. A finishing agent for fibrous cellulosic materials comprising an aqueous solution of sodium oleate and oleic acid and containing a substance obtained by reacting one mole of a resin-forming amine component selected from the group consisting of urea, guanidine, dicyandiamide, 1,3,5-aminotriazines having at least two reactive amino groups, and mixtures thereof, with between about 0.1 and about 2 moles of an epihalohydrin to form an amino-epihalohydrin adduct and reacting said adduct with between about 5.9 and about 1.5 moles of a compound capable of forming methylol groups selected from the group consisting of formaldehyde and paraformaldehyde.

37. A finishing agent for fibrous cellulosic materials which comprises an aqueous solution containing a softening agent and a substance obtained by reacting one mole of a resin-forming amine component selected from the group consisting of urea, guanidine, dicyandiamide, 1,3,5-aminotriazines having at least two reactive amino groups, and mixtures thereof, with between about 0.1 and about 2 moles of an epihalohydrin to form an amino-epihalohydrin adduct and reacting said adduct with between about 5.9 and about 1.5 moles of a compound capable of forming methyl groups selected from the group consisting of formaldehyde and paraformaldehyde.

38. A finishing agent for fibrous cellulosic materials which comprises a stable aqueous solution of a substance obtained by reacting one mole of a resin-forming amine component selected from the group consisting of urea, guanidine, dicyandiamide, 1,3,5-aminotriazines having at least two reactive amino groups, and mixtures thereof, with between about 0.1 and about 2 moles of epihalohydrin to form an amino-epihalohydrin adduct and reacting said adduct with between about 5.9 and about 1.5 moles of a compound capable of forming methyl groups selected from the group consisting of formaldehyde and paraformaldehyde; and up to about 90% of the stoichiometric equivalent of the epihalohydrin content of said reaction product, of an alkali.

39. The finishing agent claimed in claim 38 wherein the alkali is sodium hydroxide.

40. The finishing agent claimed in claim 38 wherein the alkali is magnesium hydroxide.

References Cited in the file of this patent

UNITED STATES PATENTS

| | | |
|---|---|---|
| 2,408,096 | Pierce et al. | Sept. 24, 1946 |
| 2,594,452 | Kosmin | Apr. 29, 1952 |
| 2,810,700 | Bornstein | Oct. 22, 1957 |
| 2,482,523 | Tousingnant et al. | July 8, 1958 |
| 2,850,408 | Zurawic et al. | Sept. 2, 1958 |

UNITED STATES PATENT OFFICE
CERTIFICATION OF CORRECTION

November 15, 1960

Patent No. 2,960,484

George Cecil Daul

It is hereby certified that error appears in the above numbered patent requiring correction and that the said Letters Patent should read as corrected below.

Column 6, line 42, for "0.5%" read -- 0.15% --; column 12, line 7, for "epichlorodin" read -- epichlorohydrin --; column 15, line 53, after "adduct;" insert -- and then reacting said adduct with between about 5.9 and --.

Signed and sealed this 2nd day of May 1961.

(SEAL)
Attest:

ERNEST W. SWIDER
Attesting Officer

DAVID L. LADD
Commissioner of Patents